Aug. 11, 1936.    A. ALTIERI    2,050,643
MULTIPLE LIFT TRUCK
Filed Sept. 20, 1932
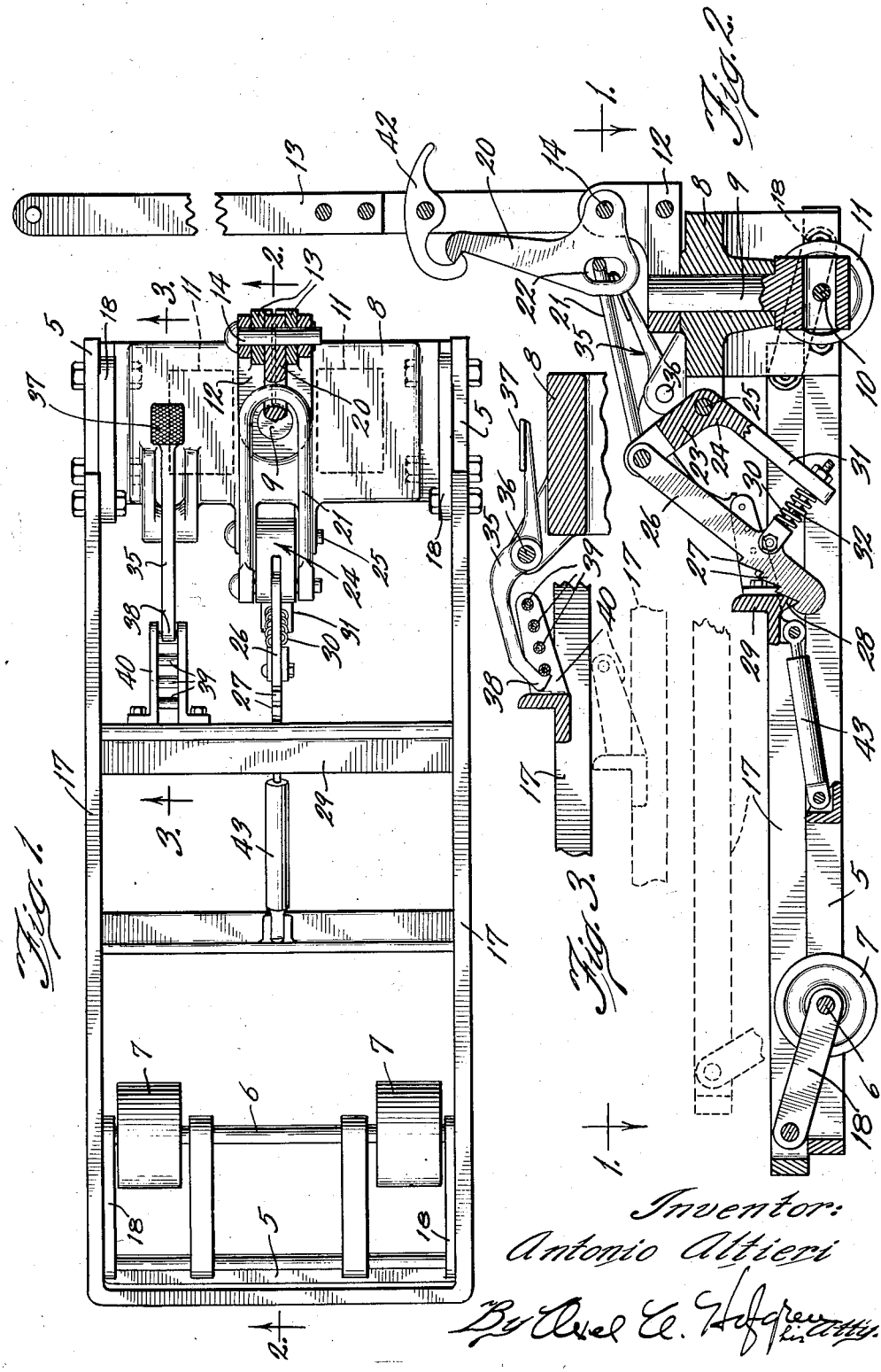
Inventor:
Antonio Altieri Patented Aug. 11, 1936

2,050,643

UNITED STATES PATENT OFFICE 2,050,643

MULTIPLE LIFT TRUCK

Antonio Altieri, Chicago, Ill., assignor, by direct and mesne assignments, to The Yale & Towne Manufacturing Company, Stamford, Conn., a corporation of Connecticut Application September 20, 1932, Serial No. 633,969

10 Claims. (Cl. 254—10)

This invention relates to portable lift trucks and has for its object the provision of a novel mechanism for raising the movable frame of the truck and for holding it in its raised position.

Another object is to provide a multiple-lift truck with a new and improved mechanism for raising the movable frame arranged to elevate the frame to any one of a plurality of different positions and to hold the frame in such positions.

Further objects will become apparent from the following detailed description taken in connection with the accompanying drawing, in which:

Fig. 1 is a plan view partly in section along the line 1—1 of Fig. 2.

Fig. 2 is a central vertical section approximately along the line 2—2 of Fig. 1, the raised position of the movable frame being indicated in dotted lines.

Fig. 3 is a fragmentary section along the line 3—3 of Fig. 1, but with the movable frame in its uppermost position, the lowered position of the frame being shown in dotted lines.

Although I have illustrated in the drawing and shall herein describe in detail a preferred embodiment of the invention, it is to be understood that I do not thereby intend to limit the invention to the specific form disclosed but aim to cover all modifications and alternative constructions falling within the spirit and scope of the appended claims.

As illustrated in the drawing, a rectangular truck frame 5 is provided with a rear axle 6 having wheels 7 thereon. A crosshead 8 extends across the front of the frame and carries a king pin 9. A horizontal shaft 10 extends through the lower end of the king pin and has a pair of wheels 11 secured thereon. At its upper end a split clamping member 12 is secured to the king pin and has an operating handle 13 pivotally connected thereto by means of a pin 14.

A rectangularly shaped movable frame 17 is mounted on the truck frame 5 by means of a plurality of links 18 which are pivotally connected to the truck frame and movable frame adjacent their corners. Thus when the movable frame is raised to the dotted line position illustrated in Fig. 2, the links swing in a clockwise direction.

The mechanism for raising the movable frame is preferably adapted to raise the frame to any one of a plurality of different positions and is herein disclosed as being operated by means of the handle 13. Thus as shown most clearly in Fig. 2 a bent arm 20 is pivotally connected to the bracket 12 by means of the handle pivot pin 14. An operating link 21 extends through an aperture 22 in the intermediate portion of said arm 20 and is connected to the upper arm or end 23 of a bell crank 24 which is pivotally mounted on the crosshead 8 by means of a pin 25. A bar 26 having a plurality of rack teeth 27 thereon is also pivotally connected to the upper end of the bell crank 24, the rack teeth being normally urged into engagement with an abutment or stationary pawl 28 carried on a crossbar 29 of the movable frame 17, by means of a coiled spring 30 positioned intermediate the rack bar and the lower arm 31 of the bell crank 24. Preferably a rod 32 is pivotally connected to the rack bar and extends through a slot in the bell crank so as to provide a guide means for the coiled spring.

As mentioned hereinbefore, the invention provides mechanism not only for raising the movable frame to any one of a plurality of different elevations, but also for holding the frame in such raised position. In the preferred form this holding means is disclosed as comprising a lever 35 pivotally mounted on the crosshead adjacent one side of the truck frame by means of a pin 36 and having a foot treadle portion 37 at one end and a curved or hook-like pawl 38 on its other end. This holding pawl is adapted to engage any one of a plurality of rollers 39 which are mounted on a bifurcated bracket 40 secured to the crossbar 29 on the movable frame.

It will be readily apparent that, by securing the bent arm 20 to move with the handle 13 by means of a latch device 42, lowering the handle causes a pivotal movement of the bell crank 24 to raise the movable frame. The holding pawl and rollers are so proportioned that the pawl will engage the first roller to hold the movable frame in the position attained by one downward movement of the handle. The handle may then be raised to engage the next tooth on the rack bar 26 with the pawl 28 after which lowering the handle raises the frame 17 so that the holding pawl can engage the second roller 39. This operation may be continued if it is desired to raise the platform even farther. After the customary loading platform has been picked up by the movable frame, the latch 42 may be disengaged and the handle used for moving and steering the truck. When it is desired to discharge the platform it is merely necessary to disengage the holding pawl 35 by means of the operator's foot, whereupon the movable frame will descend with the platform. Preferably a hydraulic check device 43 is connected intermediate the movable frame and truck frame so as to cushion the descent of the loaded platform.

I claim as my invention:

1. In a lift truck having a truck frame with a front crosshead, an operating handle, and a movable frame pivotally linked to the truck frame, in combination, a bell crank pivoted on the crosshead, means connecting the upper end of the bell crank to said handle so as to permit oscillation of the bell crank by the handle, a rack bar pivoted to the upper end of the bell crank and extending downwardly therefrom, a pawl on said movable frame, and a coiled spring intermediate the lower arm of the bell crank and rack urging the rack into engagement with said pawl.

2. In a lift truck having a truck frame with a front crosshead, an operating handle, and a movable frame pivotally linked to the truck frame, in combination, a bell crank pivoted on the cross head, means connecting the upper end of the bell crank to said handle so as to permit oscillation of the bell crank by the handle, a pawl and ratchet device connecting the upper end of the bell crank to the movable frame, one element of which device is carried by the movable frame and the other pivoted to the upper end of said bell crank.

3. In a lift truck having a truck frame with a front crosshead, an operating handle, and a movable frame pivotally linked to the truck frame, in combination, means for raising said movable frame comprising an arm pivoted on the crosshead, means connecting said arm to said handle so as to permit oscillation of the arm by the handle in any steering position, a rack bar pivoted to the upper end of the arm and extending downwardly therefrom, means on said movable frame forming a pawl, and means urging the rack into engagement with said pawl.

4. In a lift truck having a truck frame with a front crosshead, an operating handle, and a movable frame pivotally linked to the truck frame, in combination, means for raising the movable frame comprising an arm pivoted on the crosshead, means connecting the arm to said handle so as to permit oscillation of the arm by the handle, a pawl and ratchet device connecting the upper end of the arm to the movable frame, one element of which device is carried by the movable frame and the other pivoted to the upper end of said arm, and yieldable means for maintaining said elements in engagement.

5. A multiple-lift truck having, in combination, a truck frame mounted on wheels, a movable frame pivotally linked to the truck frame, means for raising the movable frame comprising a pawl and ratchet device one element of which is mounted on the truck frame and the other on the movable frame, and means for holding the movable frame in any one of a plurality of raised positions comprising a member on the movable frame supporting a plurality of rollers forming a rack, and a pawl pivotally mounted on the truck frame and arranged selectively to engage said rollers.

6. A multiple-lift truck having, in combination, a truck frame mounted on wheels, a movable frame mounted on said truck frame, means for elevating the movable frame comprising a bell crank pivoted on the truck frame, a rack bar pivoted to one arm of the bell crank and extending substantially parallel to the other arm, a pawl on the movable frame engaging said rack, a coiled spring intermediate the lower arm of the bell crank and rack urging the rack into engagement with said pawl, means for oscillating said bell crank, and means for holding said movable frame in each of its elevated positions.

7. In a multiple-lift truck having a truck frame with a front crosshead, a pivotally mounted operating handle, and a movable frame pivotally linked to the truck frame, in combination, a bell crank pivoted on the crosshead, means connecting the upper end of the bell crank to said handle so as to permit oscillation of the bell crank by the handle, a rack bar pivoted to the upper end of the bell crank and extending downwardly therefrom, a cross arm on said movable frame forming a pawl, and a coiled spring intermediate the lower arm of the bell crank and rack urging the rack into engagement with said cross arm.

8. In a lift truck having a truck frame with a front crosshead, an operating handle, and a movable frame pivotally linked to the truck frame, in combination, means for raising said movable frame comprising an arm pivoted on the crosshead, means connecting the free end of said arm to said handle so as to permit oscillation of the arm by the handle, a rack bar pivoted to the free end of the arm and extending downwardly therefrom, means on said movable frame forming a pawl, and means urging the rack into engagement with said pawl.

9. In a lift truck having a truck frame with a front crosshead, an operating handle, and a movable frame pivotally linked to the truck frame, in combination, means for raising said movable frame comprising an arm pivoted on the crosshead, means connecting the free end of said arm to said handle so as to permit oscillation of the arm by the handle, a bar pivoted to the free end of the arm and extending downwardly therefrom, and interengaging means on said bar and movable frame.

10. In a lift truck having a truck frame with a front crosshead, an operating handle, and a movable frame pivotally linked to the truck frame, in combination, a bell crank pivoted on the crosshead, means connecting the upper end of the bell crank to said handle so as to permit oscillation of the bell crank by the handle, a pawl and ratchet device connecting the upper end of the bell crank to the movable frame, one element of which device is carried by the movable frame and the other pivoted to the upper end of said bell crank, and yieldable means intermediate the lower end of the bell crank and said pivoted element for maintaining said elements in engagement.

ANTONIO ALTIERI.